UNITED STATES PATENT OFFICE.

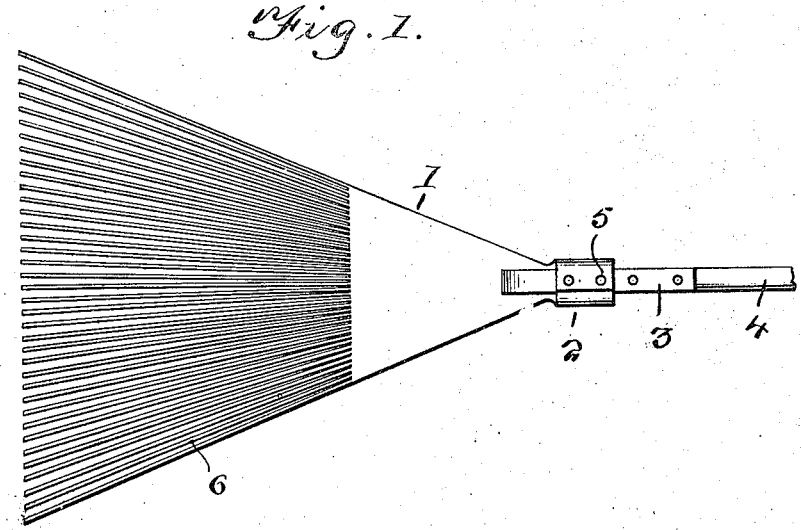
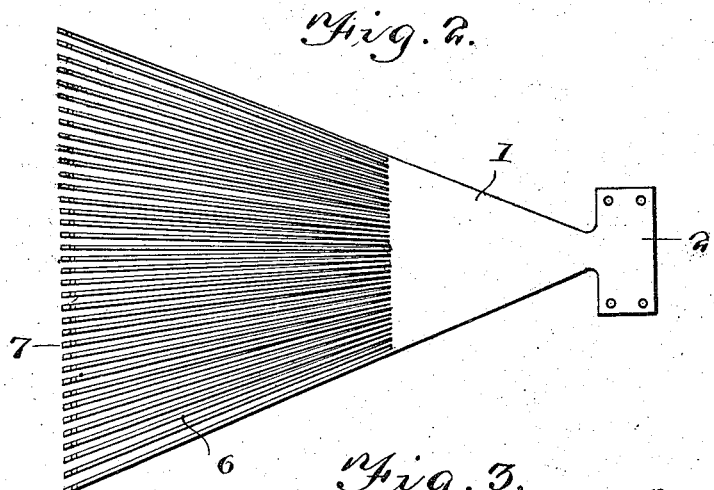
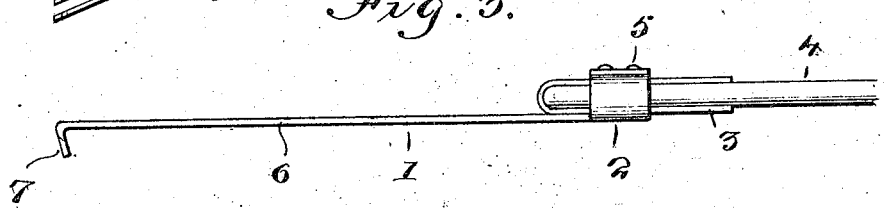

CORLEY Z. ITO, OF LOS ANGELES, CALIFORNIA.

BROOM OR RAKE.

1,179,008.  Specification of Letters Patent.  Patented Apr. 11, 1916.

Application filed September 3, 1915. Serial No. 48,854.

*To all whom it may concern:*

Be it known that I, CORLEY Z. ITO, a subject of the Emperor of Japan, residing at Los Angeles, in the county of Los Angeles and State of California, have invented new and useful Improvements in Brooms or Rakes, of which the following is a specification.

My invention relates to an improved broom or rake, designed particularly as an implement for use in clearing ground, yards and gardens of small trash and waste matter, the object of the invention being to provide a device of this character by which trash and small stuff may be brushed or raked out without disturbing the soil or grass and also without injury to plants.

A further object of the invention is to provide a simple and effective device of the character stated which may be made from sheet steel in an economical manner.

The invention consists of the features of construction, combination and arrangement of parts herein fully described and claimed, reference being had to the accompanying drawing in which:—

Figure 1 is a front elevation of the device. Fig. 2 is a rear elevation of the same. Fig. 3 is an edge view or side elevation.

The device comprises a body or head 1, which preferably comprises a flat steel plate of triangular form. At its rear or apex portion this head 1 terminates in a bracket piece 2 coöperating with a complemental bracket piece or holder 3 to receive the end of a handle 4, secured with the said holder 3 in position by fastenings 5.

From the forward edge of the body or head 1 projects a series of flexible steel tines 6 which are provided at their outer or free ends with gathering or rake fingers 7, bent inwardly or rearwardly at an angle thereto, and preferably on curved or segmental lines. These tines extend in spaced and divergent relation from the head 1, forming a fan-shaped series, the outer ends of which are spaced a relatively greater distance than the inner ends thereof, so that the gathering fingers 7 will cover a wide area of ground surface, while the head 7 is made of comparatively small size.

In the manufacture of the device, the parts 1, 2, 6 and 7 are preferably cut or stamped out from a single piece or plate of sheet metal in a single operation by the action of a die, thus insuring simplicity and economy of manufacture. The sheet metal of which the parts are made is preferably spring steel, and the tines 6 are made relatively thin, so that they will be freely flexible in all directions and resilient enough to return to normal position after displacement, said tines however being sufficiently rigid to retain their integrity and prevent them from becoming matted or tangled together or from being bent out of their normally spaced position. The handle attaching member 2 may be of the construction shown or any other suitable construction, and the handle 4 may be made of wood or other suitable material.

In the use of the device, it may be employed as a broom or rake to gather up trash and small stuff in a yard, garden, flower bed, or other place where small waste matter such as the refuse portions of cigars, cigarettes, paper, and dead leaves are liable to be thrown or blown, the construction being such that the fingers of the flexible tines may pick up such small articles without taking up the earth and without injury to the grass or growing plants. Furthermore, the flexible tines and their fingers may be employed to work through or between plants to gather up refuse matter, dead leaves, and the like, without injury to or displacement of the parts of the growing plants, and, owing to the form of the brush, the device may be used in confined spaces with great facility. The brush will be found of great efficiency in working over unlevel ground or irregular surfaces, gravel beds, and the like, and, as it is light in weight, it may be employed upon the most delicate lawns without injury to fine grass, as the flexible steel tines will slide over the stems and roots of the grass without injury thereto.

I claim:—

As a new and improved article of manufacture, a brush or rake formed from a thin, flat, substantially triangular body of sheet metal, said body having an imperforate apex portion forming a triangular head, and the remainder of the body being longitudinally slotted from the head to the base or widened end of the body to provide at its widened portion a fan-shaped series of long, flat and slender, universally flexible spring tines which are spaced for free lateral movements, said tines being provided at their free ends with angularly bent gathering fingers, the body portion of the plate and the body portions of the tines being arranged to lie in a common plane, and a handle connected with the apex head portion of the plate.

In testimony whereof I affix my signature in presence of two witnesses.

CORLEY Z. ITO.

Witnesses:
R. A. WINNETT,
H. W. SHULTZ.